(12) United States Patent
Cho

(10) Patent No.: US 11,056,697 B2
(45) Date of Patent: Jul. 6, 2021

(54) APPARATUS AND SYSTEM FOR DISCHARGING WATER OF FUEL CELL

(71) Applicants: Hyundai Motor Company, Seoul (KR); Kia Motors Corporation, Seoul (KR)

(72) Inventor: Min Kyung Cho, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 23 days.

(21) Appl. No.: 16/560,580

(22) Filed: Sep. 4, 2019

(65) Prior Publication Data
US 2020/0280081 A1 Sep. 3, 2020

(30) Foreign Application Priority Data
Feb. 28, 2019 (KR) .................. 10-2019-0024315

(51) Int. Cl.
*H01M 8/04119* (2016.01)
*H01M 8/04828* (2016.01)
*H01M 50/40* (2021.01)

(52) U.S. Cl.
CPC ... *H01M 8/04164* (2013.01); *H01M 8/04828* (2013.01); *H01M 50/40* (2021.01)

(58) Field of Classification Search
CPC . H01M 8/04164; H01M 8/04828; H01M 2/14
See application file for complete search history.

(56) References Cited

U.S. PATENT DOCUMENTS

| 2009/0208790 | A1* | 8/2009 | Park | H01M 8/04007 |
| | | | | 429/438 |
| 2016/0260992 | A1* | 9/2016 | Ode | H01M 8/0662 |

FOREIGN PATENT DOCUMENTS

| JP | 2017-97977 A | 6/2017 |
| KR | 100700073 B1 | 3/2007 |
| KR | 101684111 B1 | 12/2016 |
| KR | 20180109108 A | 10/2018 |

* cited by examiner

*Primary Examiner* — Stewart A Fraser
(74) *Attorney, Agent, or Firm* — Mintz Levin Cohn Ferris Glovsky and Popeo, P.C.; Peter F. Corless

(57) ABSTRACT

An apparatus for discharging water of a fuel cell is provided. The apparatus includes a separation tube that has an inlet formed to face up to be connected to a fuel cell stack and has a first outlet and a second outlet to separately discharge gas and liquid. A discharge tube is connected to the first outlet formed at a lower portion of the separation tube, extends downward, and has a bending portion that bends upward at a predetermined section.

17 Claims, 2 Drawing Sheets

APPARATUS AND SYSTEM FOR DISCHARGING WATER OF FUEL CELL

CROSS REFERENCE TO RELATED APPLICATION

The present application claims priority of Korean Patent Application No. 10-2019-0024315 filed on Feb. 28, 2019, the entire contents of which is incorporated herein for all purposes by this reference.

BACKGROUND

1. Field of the Disclosure

The present disclosure relates to an apparatus for discharging water of a fuel cell and a system of the same and, more particularly, to a technology of preventing flooding by discharging water produced from an electrochemical reaction in a fuel cell.

2. Description of the Prior Art

A fuel cell is an energy conversion device that converts chemical energy of fuel into electrical energy using electrochemical energy without converting the chemical energy into heat through combustion and may be used for supplying power for the industry, home, and vehicles, and also for supplying power to small-sized electric/electronic products and portable devices. In particular, in a polymer electrolyte membrane fuel cell (PEMFC) having high power density, a membrane-electrode assembly (MEA) which is a main component is disposed at the innermost spot. The MEA is composed of a solid polymer electrolyte membrane capable of transferring hydrogen ions and a cathode and an anode that are electrode layers plated with a catalyst where hydrogen and oxygen react on each side of the MEA.

In particular, water is produced through the electrochemical reaction of oxygen from the air and hydrogen supplied to cathode and anode, respectively in the MEA during the power generation process. To prevent deterioration due to dry-out, providing appropriate levels of humidity to a fuel cell stack is necessary. Further, when produced water is collected in the fuel cell stack, the accumulated water may cause flooding which impedes reactant diffusion to the catalyst sites. Therefore, it is important to discharge generated water in the MEA to the outside for smooth reaction of oxygen and hydrogen.

The description provided above as a related art of the present disclosure is merely for helping understanding the background of the present disclosure and should not be construed as being included in the related art known by those skilled in the art.

SUMMARY

The present disclosure has been made in order to solve the above-mentioned problems in the prior art and an aspect of the present disclosure provides an apparatus for discharging water produced in a fuel cell stack through a cathode outlet.

The apparatus may include a separation tube having an inlet formed to face up to be connected to a fuel cell stack and having a first outlet and a second outlet for separately discharging gas and liquid; and a discharge tube connected to the first outlet formed at a lower portion of the separation tube, extending downward, and having a bending portion bent upward at a predetermined section.

The separation tube may separate gas and liquid flowing inside from the fuel cell stack through the inlet, and may discharge liquid to the first outlet and gas to the second outlet. Additionally, the separation tube may have a Y-shape with the first outlet facing down and the inlet and second outlet facing up. A check valve that allows liquid to flow in one direction may be disposed at the second outlet. The check valve at the second outlet may allow gas in the separation tube to be discharged outside and may prevent the air outside the separation tube from flowing thereinto.

The bending portion of the discharge tube may have an S-shape that is bent upward higher in the gravity direction and then bent downward. The discharge tube may be made of a hydrophobic material. The inner side of the discharge tube may be made to have rough surface. The apparatus may further include a condensing plate disposed in the separation tube and separating liquid from gas flowing into the inlet of the separation tube from the fuel cell stack. The condensing plate may be an elongated flat plate made of polypropylene. Additionally, the condensing plate may have a shape that bends to extend from the inlet to the first outlet of the separation tube.

In view of the foregoing, a system for discharging water of a fuel cell according to the present disclosure may include: a fuel cell stack configured to receive hydrogen and air so that hydrogen and oxygen react with each other therein; a separation tube having an inlet formed to face up to be connected to an air outlet of the fuel cell stack and having a first outlet and a second outlet for separately discharging gas and liquid; and a discharge tube connected to the first outlet formed at the lower portion of the separation tube, extending downward, and having a bending portion that bends upward at a predetermined section.

According to the apparatus for discharging water of a fuel cell of the present disclosure, water discharged from the fuel cell stack may be intermittently and instantaneously discharged by the siphon principle and surface tension. Further, instantaneous negative pressure may be generated at the air outlet of the fuel cell stack, so the effect of discharging water out of the fuel cell stack may be improved, whereby the fuel cell stack may be prevented from being flooded.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
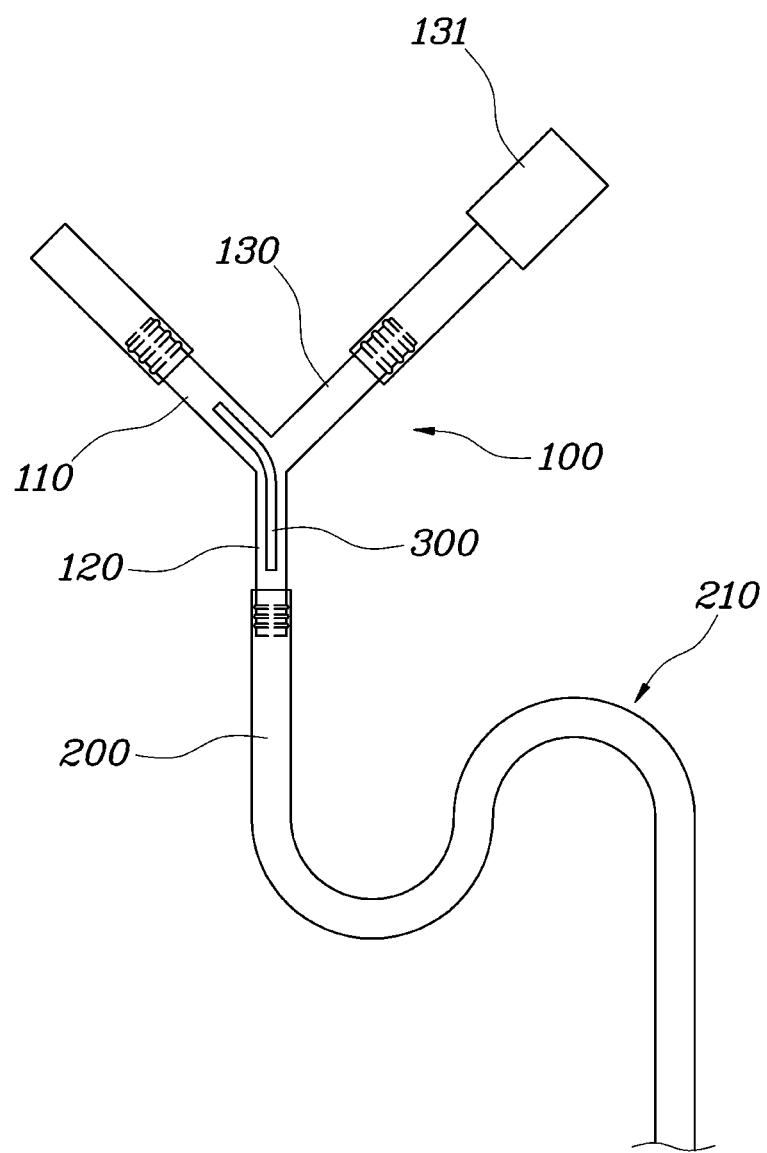
FIG. 1 is a view showing an apparatus for discharging water of a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A specific structural or functional description of embodiments of the present disclosure disclosed in the specification or application is given merely for the purpose of describing the embodiment according to the present disclosure. Therefore, the exemplary embodiments according to the present disclosure may be implemented in various forms, and the present disclosure should not be construed as being limited to the exemplary embodiments described in the specification or application.

Various changes and modifications may be made to the exemplary embodiments according to the present disclosure, and therefore particular exemplary embodiments will be illustrated in the drawings and described in the specification or application. However, it should be understood that exemplary embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an exemplary embodiment of the present disclosure will be described in detail with reference to the accompanying drawings. Similar reference numerals presented in the drawings denote similar elements. FIG. 1 is a view showing an apparatus for discharging water of a fuel cell according to an exemplary embodiment of the present disclosure and FIG. 2 is a view showing a system for discharging water of a fuel cell according to an exemplary embodiment of the present disclosure.

Figure 2:
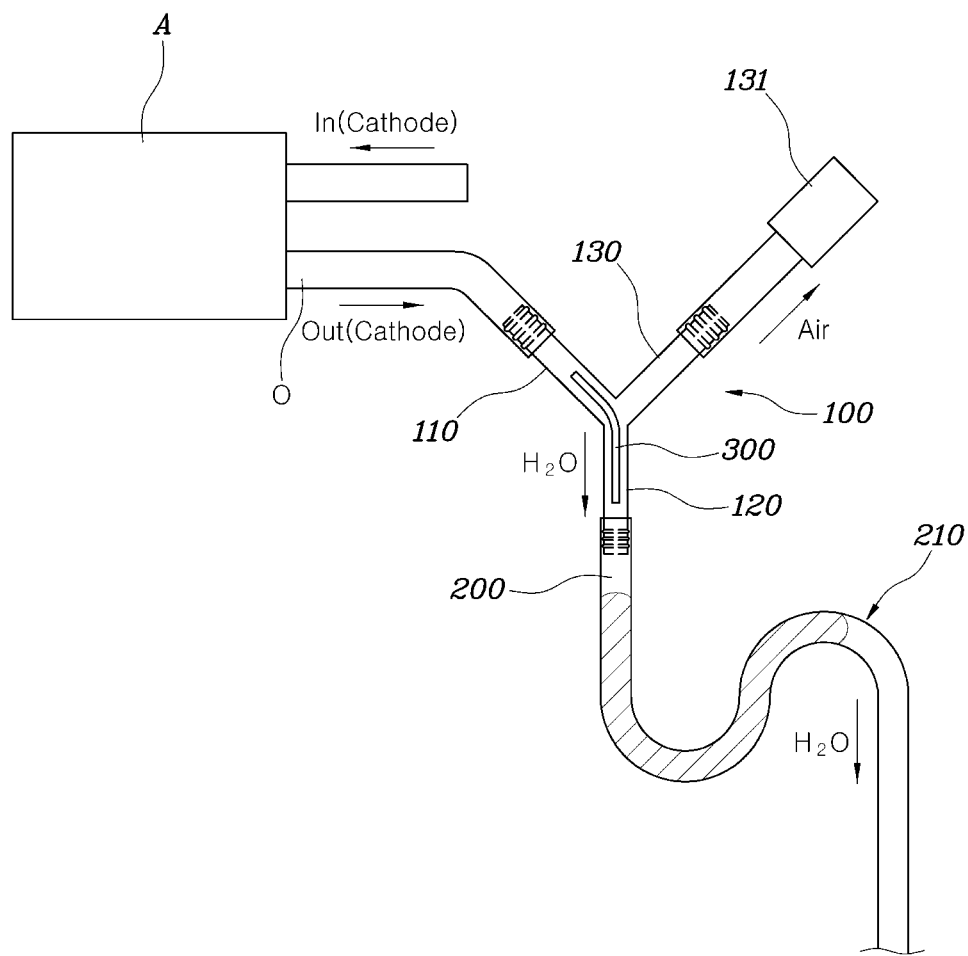
FIG. 2 is a view showing a system for discharging water of a fuel cell according to an exemplary embodiment of the present disclosure.

Referring to FIGS. 1 and 2, a system for discharging water of a fuel cell according to an exemplary embodiment of the present disclosure may include: a fuel cell stack A configured to receive hydrogen and air so that hydrogen and oxygen react with each other therein; a separation tube 100 having an inlet 110 formed to face up to be connected to an air outlet O of the fuel cell stack A and having a first outlet 120 and a second outlet 130 for separately discharging gas and liquid; and a discharge tube 200 connected to the first outlet 120 formed at the lower portion of the separation tube 100, extending downward, and having a bending portion 210 that bends upward at a predetermined section.

An apparatus for discharging water of a fuel cell according to an exemplary embodiment of the present disclosure may include: a separation tube 100 having an inlet 110 formed to face up to be connected to a fuel cell stack A and having a first outlet 120 and a second outlet 130 for separately discharging gas and liquid; and a discharge tube 200 connected to the first outlet 120 formed at the lower portion of the separation tube 100, extending downward, and having a bending portion 210 that bends upward at a predetermined section.

The fuel cell stack A may include an MEA therein and, hydrogen and air may be supplied to an anode and a cathode, respectively, in the MEA. In other words, the fuel cell stack A may be configured to receive hydrogen and air to allow hydrogen and oxygen to react with each other through a catalyst therein. Hydrogen and oxygen generate electric energy by reacting with each other and produce heat and produced water (water) as byproducts.

Appropriate humidity should be maintained for smooth reaction of hydrogen and oxygen in the fuel cell stack A. In particular, a humidifier may be separately provided to prevent dry-out of the fuel cell stack A when air is supplied to the cathode of the fuel cell. In contrast, even when water is excessively produced in the fuel cell stack A and floods the fuel cell stack, hydrogen and oxygen are unable to react smoothly. Accordingly, it may be possible to discharge produced water remaining in the fuel cell stack A using air that is supplied to the cathode of the fuel cell stack A and then discharged.

The inlet 110 of the separation tube 100 may be connected to the air outlet O of the fuel cell stack, to thus remove water in the air discharged from the fuel cell stack A. In particular, the separation tube 100 may separate and discharge air and water flowing inside through the inlet 110 to the first outlet 120 and the second outlet 130. Since the inlet 110 of the separation tube 100 may be formed to face upwards, water separated from a mixture of air and water flowing from the inlet 110 of the separation tube 100 may be discharged to the first outlet 120 formed at the lower portion of the separation tube 100.

Additionally, the discharge tube 200 may be connected to the first outlet 120 formed at the lower portion of the separation tube 100 and may be positioned under the separation tube 100. Since the discharge tube 200 has the bending portion 210 that extends downward from the first outlet 120 and then bends upward at a predetermined section, a predetermined amount of liquid flowing in the discharge tube 200 from the first outlet 120 of the separation tube 100 may be stored in the discharge tube 200. In other words, a predetermined amount of liquid may be stored in the discharge tube 200 at the bending portion 210 that bends upward at the predetermined section of the discharge tube 200. When liquid, in an amount greater than a predetermined amount, flows in the discharge tube 200 through the separation tube 100, the liquid may be discharged to the outside by a siphon principle.

In particular, when surface tension is broken by the surface tension acting between liquid molecules of the liquid stored in the bending portion 210, the liquid stored in the bending portion 210 may be intermittently discharged outside and liquid that exceeds the equilibrium state of pressure according to the siphon principle may be discharged when the liquid is discharged. Accordingly, liquid separated from the separation tube 200 may be intermittently discharged by the siphon principle and surface tension and generates instantaneous negative pressure therein, and thus, water in the fuel cell stack A may be discharged more smoothly.

The separation tube 100 may separate gas and liquid flowing inside from the fuel cell stack A through the inlet 110, and discharge liquid to the first outlet 120 and gas to the second outlet 130. A mixture of air passing through the fuel cell stack A and water produced in the fuel cell stack A may flow into the inlet 110 of the separation tube 100, and condensed water may be separately discharged to the first outlet 120 formed at the lower portion of the separation tube 100 and air may be separately discharged to the second outlet 130 by gravity. Accordingly, by separating and discharging the condensed water to the first outlet 110, a predetermined amount of liquid may be maintained in the discharge tube 200.

Additionally, the separation tube 100 may have a Y-shape with the first outlet 120 facing down and the inlet 120 and second outlet 130 facing up. In other words, the separation tube 100 may have a 3-way Y-shape with the inlet 110 and second outlet 130 facing up and the first outlet 120 facing downward. Accordingly, water and air flowing inside through the inlet 110 may be separated, and thus, the water may be discharged to the first outlet 120 facing down and the air may be discharged to the second outlet 130 facing up.

A check valve 131 that allows liquid to flow only in one direction may be disposed at the second outlet 130. In particular, the check valve 131 may allow the air in the separation tube 100 to flow only to the outside. Additionally, the check valve 131 at the second outlet 130 may allow gas in the separation tube to be discharged outside and prevent the air outside the separation tube 100 from flowing inside. Accordingly, when negative pressure is generated in the separation tube 100 by water intermittently and instantaneously discharged through the first outlet 120, external air may be prevented from flowing inside through the second outlet 130, and thus, the effect of more smoothly discharging water out of the fuel cell stack A may be improved.

Particularly, the check valve 131 may be a poppet valve having a head and a stem. Accordingly, the check valve 131 may have a strong structure that withstands a pressure difference between the separation tube 100 and the outside. The bending portion 210 of the discharge tube 200 may be formed in an S-shape bending upward higher in the gravity direction and then bending downward. In other words, the discharge tube 200 may extend downward from the first outlet 120 formed at the lower portion of the separation tube 100, bend upward higher in the gravity direction at a predetermined middle section, and then bend downward. Accordingly, a predetermined amount of water may be collected in the discharge tube 200 up to the upward-bending height of the bending portion 210.

Further, the discharge tube 200 may be made of a hydrophobic material. In particular, the discharge tube 200 may be made of hydrophobic silicon that reduces the bonding force between water and the surface of the discharge tube 200 to increase the surface tension of the water discharged and collected from the separation tube 100. The inner side of the discharge tube 200 may be made with a rough material or a material creating a rough surface (e.g., uneven or friction surface). In other words, by making the surface of the discharge tube 200 even and rough, the surface tension of the water collected therein may be increased. Accordingly, the period and amount of water that is instantaneously discharged when the surface tension is broken in the discharge tube 200 may be increased, and thus, a negative pressure difference between the separation tube 100 and the discharge tube 200 increases, thereby improving the effect of discharging water from the fuel cell stack A.

A condensing plate 300 disposed in the separation tube 100 and that separates liquid from gas flowing into the inlet 110 of the separation tube 100 from the fuel cell stack A may be further included. The condensing plate 300 may be configured to condense the air flowing inside through the inlet 110 of the separation plate 100. Accordingly, water in air condenses by coming in contact with the condensing plate 300 and may be discharged to the discharge tube 200 through the first outlet 120, thereby increasing the amount of water that is discharged from the discharge tube 200. Accordingly, water may be discharged more smoothly through the discharge tube 200.

In particular, the condensing plate 300 may be formed as an elongated flat plate made of polypropylene. Additionally, the condensing plate 300 may have a stick shape that extends in the longitudinal direction and may have an elongated flat plate shape for increasing the area that is brought in contact with the air discharged from the air outlet O of the fuel cell stack A. Accordingly, the air flowing into the separation tube 100 through the inlet 110 may be maximally condensed and condensed water may be maximally discharged to the separation tube 100 and negative pressure may be generated in the separation tube 100, thereby improving the effect of discharging water remaining in the fuel cell stack.

In addition, the condensing plate 300 may have a shape that bends to extend to the first outlet 120 from the inlet 110 of the separation tube 100. In particular, the condensing plate 300 may have a shape that extends to the first outlet 120 from the inlet 110 of the separation tube 100 and that bends to be fixed in the separation tube 100 formed in a Y-shape. Accordingly, the condensing plate 300 may be fixed without being discharged through the first outlet 120 formed at the separation tube 100 by gravity, and thus, may transport and discharge the condensed water produced at the inlet 110 of the separation tube 100 to the first outlet 120.

Although the present disclosure has been described and illustrated with reference to the particular exemplary embodiments thereof, it will be apparent to those skilled in the art that various improvements and modifications of the present disclosure may be made without departing from the technical idea of the present disclosure provided by the following claims.

What is claimed is:

1. An apparatus for discharging water of a fuel cell, comprising:
 a separation tube having an inlet formed to face up to be connected to a fuel cell stack and having a first outlet and a second outlet for separately discharging gas and liquid; and
 a discharge tube connected to the first outlet formed at a lower portion of the separation tube, extending downward, and having a bending portion that bends upward at a predetermined section to have a U-shape portion.

2. The apparatus of claim 1, wherein the separation tube separates gas and liquid flowing inside from the fuel cell stack through the inlet, and discharges liquid to the first outlet and gas to the second outlet.

3. The apparatus of claim 1, wherein the separation tube is formed as a Y-shape with the first outlet facing down and the inlet and second outlet facing up.

4. The apparatus of claim 3, further comprising:
 a check valve that allows liquid to flow in one direction is disposed at the second outlet.

5. The apparatus of claim 4, wherein the check valve at the second outlet allows gas in the separation tube to be discharged outside and prevents the air outside the separation tube from flowing thereinto.

6. The apparatus of claim 1, wherein the bending portion of the discharge tube is formed as an S-shape that bends upward higher in a gravity direction and then bends downward.

7. The apparatus of claim 1, wherein the discharge tube is made of a hydrophobic material.

8. The apparatus of claim 1, wherein the inner side of the discharge tube is made of a rough material.

9. The apparatus of claim 1, further comprising:
 a condensing plate disposed in the separation tube and configured to separate liquid from gas flowing into the inlet of the separation tube from the fuel cell stack.

10. The apparatus of claim 9, wherein the condensing plate is formed as an elongated flat plate made of polypropylene.

11. The apparatus of claim 9, wherein the condensing plate has a shape that bends to extend from the inlet to the first outlet of the separation tube.

12. A system for discharging water of a fuel cell, comprising:
 a fuel cell stack configured to receive hydrogen and air to allow hydrogen and oxygen to react with each other therein;
 a separation tube having an inlet formed to face up to be connected to an air outlet of the fuel cell stack and having a first outlet and a second outlet to separately discharge gas and liquid; and
 a discharge tube connected to the first outlet formed at the lower portion of the separation tube, extending downward, and having a bending portion that bends upward at a predetermined section to have a U-shape portion.

13. The system of claim 12, wherein the separation tube is formed as a Y-shape with the first outlet facing down and the inlet and second outlet facing up.

14. The system of claim 13, further comprising:
 a check valve that allows liquid to flow in one direction is disposed at the second outlet.

15. The system of claim 14, wherein the check valve at the second outlet allows gas in the separation tube to be discharged outside and prevents the air outside the separation tube from flowing thereinto.

16. The system of claim 12, wherein the bending portion of the discharge tube is formed as an S-shape that bends upward higher in a gravity direction and then bends downward.

17. The system of claim 12, further comprising:
 a condensing plate disposed in the separation tube and configured to separate liquid from gas flowing into the inlet of the separation tube from the fuel cell stack.

* * * * *